March 15, 1960   R. T. BAYARD ET AL   2,928,965
NEUTRON DETECTOR
Filed Oct. 27, 1954

United States Patent Office 2,928,965
Patented Mar. 15, 1960

2,928,965

NEUTRON DETECTOR

Robert T. Bayard and Thomas J. Walker, Pittsburgh, Pa., assignors to Westinghouse Electric Corporation, East Pittsburgh, Pa., a corporation of Pennsylvania Application October 27, 1954, Serial No. 465,605

11 Claims. (Cl. 313—61)

Our invention relates to radiation detectors and, more particularly, to an improved detector for fast neutrons.

In the course of many scientific investigations, it is often desired to measure the neutron intensity from a weak source of radiation. At present there are three types of detectors generally used, namely, proportional counters, ionization chambers, and Geiger-Muller counters to measure neutron radiations. One of the most sensitive of these is a boron trifluoride proportional counter, hereinafter called a $BF_3$ counter. Most sources of neutron radiation also include considerable gamma ray flux, the presence of which in sufficient intensity can greatly reduce the size of pulses of a $BF_3$ counter produced by neutron radiation. This is due to the fact that a sheath of positive ions is formed around the central electrode of the counter by the ionization caused by the gamma flux. This positive sheath reduces the electric field intensity in the immediate neighborhood of the electrode, where the gas multiplication takes place, and since the amount of multiplication depends on the strength of the electric field, the multiplication and, therefore, the pulse size produced by the neutron radiation is reduced by the positive ion sheath.

We have discovered that a considerable reduction of this effect results when the outer case or housing of the usual $BF_3$ counter is partly replaced by a material having a low atomic number. This can be understood as follows: The gamma rays interact with material, for example that in the outer case or housing of the $BF_3$ counter, to produce very energetic electrons. These electrons dissipate their energy principally by ionization. Materials of low atomic number such as hydrogen and carbon do not interact as strongly with gamma rays, and therefore yield fewer energetic electrons, than materials such as brass or aluminum which have higher atomic numbers.

In addition, a $BF_3$ counter is sensitive to only slow or thermal neutrons, and thus some provision must be made for slowing down the fast neutrons to the thermal range if the counter is to detect neutrons of various energies. It is known that material having a low atomic number is very effective in slowing fast neutrons; thus our $BF_3$ counter surrounded by a material having a low atomic number will be sensitive to neutrons of wide energy levels.

The most obvious way to still further increase the sensitivity of a $BF_3$ counter would be to increase its size, which would in turn increase the amount of sensitive boron trifluoride gas in the counter. This can only be done within limits, because a point is reached where the neutron induced pulses are no longer uniform in size and the accuracy of the counter is distorted. The reason for this non-uniformity can be seen as follows: There is a certain probability that an electron produced by the interaction of a neutron with a boron 10 atom will be captured in a collision with a boron trifluoride molecule, thus producing a negative ion. Only free electrons contribute to the voltage pulse so that any electron so captured is lost, as far as its contribution to the pulse is concerned. The probability that an electron will be captured is equal to the product of the probability of capture per collision times the number of collisions which the electron suffers. If this product is considerably smaller than unity, even for those electrons which traverse the longest path, then practically no electrons will be lost from any of the pulses and all pulses will be of the same size. As the size of the counter is increased, the possibility of capture of the electrons travelling the longest path is greatly increased, due to the increase in the number of collisions. Thus the pulses resulting from these electrons will be noticeably attenuated. The pulses resulting from electrons which do not have to travel as far are not attenuated as much, and the result is a non-uniformity of pulse size. An increase in pressure of the $BF_3$ gas in the counter has the same effect as an increase in the size of the counter on the uniformity of the pulses because again the number of collisions between the free electrons and $BF_3$ molecules are increased.

We have avoided this inability to increase the sensitivity of a $BF_3$ counter by either increasing its size or the pressure of the $BF_3$ gas by sub-dividing the counter into a number of individual cells. Each cell of our $BF_3$ counter is the substantial equivalent of a standard $BF_3$ counter. Thus, if seven cells are used, the pulse from the counter will be just as large as a pulse from a standard $BF_3$ counter when both are exposed to the same neutron radiation, but there will be approximately seven times as many per unit time for a given neutron flux. Of course, the sensitivity cannot be increased indefinitely by increasing the number of cells beyond that required to absorb all the thermal neutrons. We have also avoided this limitation by decreasing the diameter of the cells while increasing the pressure of the $BF_3$ gas so that the quantity of $BF_3$ gas remains the same as in the former cells and filling the space made available with additional material having a low atomic number such as a hydrogenous material or graphite. This material acts as a moderator and slows down still more fast neutrons, thus further increasing the counter's sensitivity. We have found that if the pressure is increased by a factor of four, the plateau on the counting rate vs. voltage curve is not flat, but if the pressure is increased only a factor of three, the counter has a good plateau and the counter gives very good response to weak neutron radiation.

It is, accordingly, the object of our invention to provide a very sensitive neutron detector capable of detecting fast neutrons.

It is another object of our invention to provide a neutron detector having a plurality of $BF_3$ counter cells, each cell being the equivalent of a standard $BF_3$ counter cell.

It is another object of our invention to provide a neutron detector fabricated principally of a low atomic number material which interacts weakly with gamma radiation, said material to perform at the same time the function of moderating or slowing down the fast neutrons.

It is another object of our invention to provide a sensitive neutron detector of novel and extremely rugged construction, where the moderating material in addition serves as a construction material.

These and other objects and advantages will be more clearly understood from the following detailed description of specific embodiments thereof when taken in connection with the attached drawings, in which.

Figure 1:
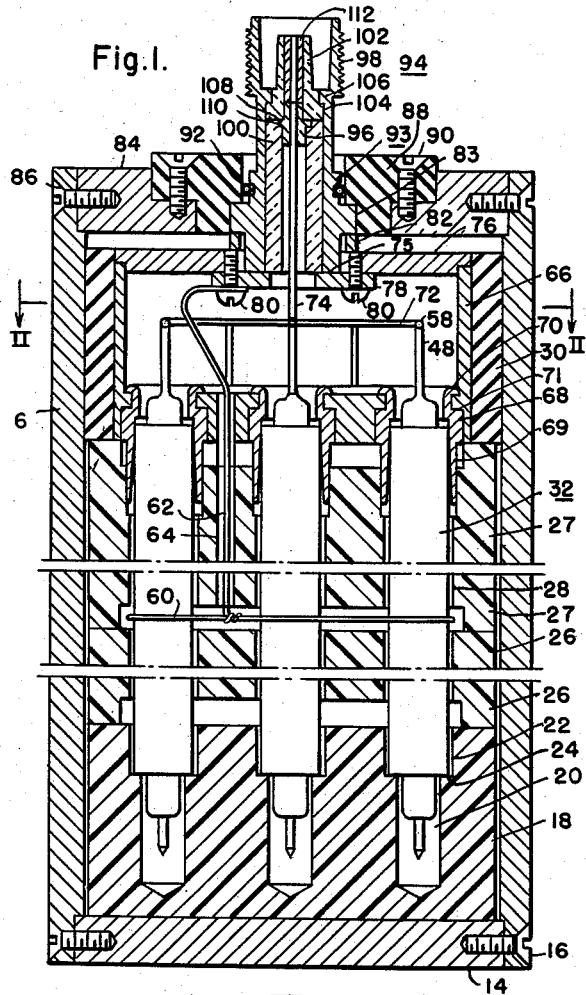
Figure 1 is a longitudinal section of one embodiment of our invention.

The embodiment of our invention, illustrated in Fig. 1, has a generally tubular-shaped outer case with means provided for closing both ends of the case. Positioned on the inside of the outer case is a neutron slowing material of low atomic number which has a plurality of longitudinal holes, with an individual $BF_3$ counter inserted in each longitudinal hole of the neutron slowing material. The individual $BF_3$ counters are connected in parallel and the leads attached to a suitable co-axial connector 94 at ane end of the outer case. The connector 94 can be attached to well known amplifying and counting circuits by suitable connections.

The outer assembly case consists of a tube 6, preferably of a material having a low absorption cross-section for neutrons and a low atomic number, such as aluminum. The bottom end of tube 6 is closed by means of bottom plate 14, preferably of the same material as the tube 6 and is secured in place by means of cap screws 16, which pass radially through the tube 6 and thread into the bottom plate 14. A series of blocks 18, 26, 27 and 30, shaped to fit the inner surface of tube 6 are positioned within the tube 6. The blocks 18, 26, 27 and 30 are preferably of a material having a low atomic number and capable of slowing down neutrons of fast velocities to neutrons of thermal velocities. We prefer to use a hydrogeneous material, such as one of the high temperature plastics, which are composed chiefly of carbon and hydrogen. Examples of such materials are nylon and polyethylene. The lower block 18 has a plurality of longitudinal recesses 20 which are counter bored for part of their depth to a larger diameter 22 so as to form an inwardly projecting shoulder 24 on which the individual $BF_3$ counter cells may rest. The middle block 26 has the same number of holes as the lower block 18, but they are not counter bored, and the same is true for the upper block 27. Alternatively, the lower block 18 and the middle block 26 can be formed integrally from a single block (not shown) of neutron-moderating material.

Figure 3:
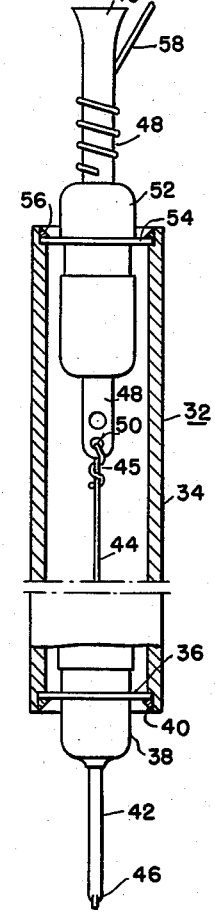
Fig. 3 is a longitudinal section of one of the $BF_3$ counter cells shown in Fig. 1 drawn to an enlarged scale.
Figure 2:
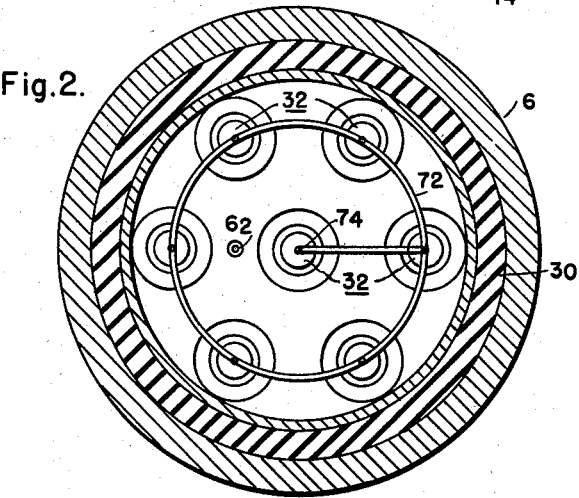
Fig. 2 is a horizontal section taken along the line II—II of Fig. 1.

The individual $BF_3$ counter cells 32 have a thin tubular outer shell 34 as shown in Fig. 3. The outer case 34 is preferably of a material having a low absorption cross-section for neutrons and a low interaction cross-section for gamma-rays (low atomic number) and yet which can be fabricated into a gas-tight housing. A material such as aluminum satisfies these requirements fairly well, although its atomic number is not as low (13) as carbon (6) or hydrogen (1). Therefore, it is desirable to make the outer shell 34 as thin as possible in order to reduce the interactions with gamma-rays. Thicknesses of the order of 1/32 inch and less are usable. Materials such as lithium or beryllium, while desirable from the point of view of gamma-ray interaction, are either weak mechanically, subject to corrosion, have a low melting point (lithium), or are difficult and dangerous to fabricate and very expensive (beryllium). We prefer to make the radius of outer shell 34 equal to or less than the distance where practically no free electrons are captured by $BF_3$ molecules while the free electrons travel to the anode of the individual counter cells 32. We have found that a diameter on the order of one-half inch for the shell 34 gave very good results when the individual counter cells were filled with gas to a pressure on the order of two to three atmospheres. The lower end of the outer shell 34 is closed by means of a metallic disc 36, preferably of a material capable of being sealed to glass, such as Kovar alloy. Disc 36 has a glass insert 38 sealed in a central opening, and it is attached to the outer shell 34 by means of a solder joint 40. Sealed in the center of the glass insert 38 is a small tube 42, preferably of the same material as disc 36.

The other end of the outer shell 34 is closed by means of a metallic disc 54 of the same material as the disc 36, which also has a glass insert 52 sealed in a central opening. The disc 54 is attached to the outer shell by means of a solder joint 56. A tube 48, preferably of the same material as disc 36, passes through the center of the glass insert 52 and extends into the outer shell 34. A central wire 44 is first attached to the tube 48 by threading it through a hole 50 in the lower end of the tube 48 and then doubling it back over itself and twisting the free end around the adjacent portion 45 of the central wire 44. The other end of the central wire 44 is threaded through the tube 42 in the lower end of the counter cell 32. After the wire 44 is threaded through the tube 42, it is drawn taut and secured in position by crimping the end 46 of the tube 42 and soldering the end 46 of tube 42 closed. After both discs 36 and 54 have been soldered to the outer shell 34 and the central wire 44 installed, the counter is evacuated through the tube 48 and filled with the required quantity of gas, and then the upper end 49 of the tube 48 is closed and sealed. We prefer to fill our counter cells to a pressure of between two and three atmospheres, using a gas that will interact with thermal neutrons to produce a particle capable of ionizing the gaseous filling and at the same time a gas having a low electron attachment coefficient. Boron trifluoroide gas satisfies all of these requirements, as would other noble gases. A lead wire 58 is wrapped around the outer surface of the tube 48 and soldered to the surface of tube 48.

The individual $BF_3$ counters are connected together by means of a common wire 60 which is soldered to or frictionally engages each outer shell 34 of the individual counters. The required number of counter cells 32 with the common wire 60 attached are then inserted into the blocks 18 and 26 which have previously been positioned in the counter case. A lead 62 is attached to the common wire 60 and threads through a small hole 64 in the upper block 27, which is then positioned in the counter tube 6. The individual $BF_3$ counters 32 are retained in the blocks 18, 26 and 27 by means of bushings 68 which have outwardly tapering inner surfaces 69. The outwardly tapered surfaces 69 of bushings 68 serve to force the individual counters 32 firmly against the shoulder 24 formed in block 18. Bushings 68, which are preferably of an electrical conducting material, such as aluminum, are retained in spaced holes in the bottom wall of a cup-shaped retainer 66 by means of a turned-over upper edge 70 thereof and a cooperating outwardly projecting flange 71 on each bushing 68. The outwardly tapered inner surface 69 of each bushing 68 makes a firm electrical contact with the outer shell 34 of the individual counter cells. The block 30 is then installed in the counter case and surrounds the wall of the member 66.

The upper leads 58 of the individual counter cells 32 are connected to a common wire 72 and a lead 74 is attached to the common wire 72. The lead 74 is attached to the center insert 96 of a coaxial connector 94 by any suitable means, such as soldering. Insert 96 is insulated from the connector housing 98 by insulating sleeves 100 and 102, preferably of an insulating material, such as molded plastic. Insulating sleeve 102 is retained in the housing 98 by means of an outwardly projecting flange 104 which rests against an inwardly projecting shoulder 106 of the housing 98. Insulating sleeve 100 forces insulating sleeve 102 into position and, in addition, retains insert 96 in position by means of a flange 108 on insert 96 and a cooperating shoulder 110 formed on the upper surface of sleeve 100. Insulating sleeve 100 is retained in housing 98 by a ring 78 described below. A thin tube 112 which is connected to insert 96 by any suitable means, such as soldering, extends through the central opening of insulating sleeve 102 and forms a female contact for connector 94. The retainer 66 is closed at the top by means of a cover plate 76, preferably of an electrically conducting material, such as aluminum. Cover plate 76 has a relatively large central opening for the connector 94 to pass through. The bottom surface of connector 94 rests on ring 78 which is secured to cover plate 76 and is secured in the top of the counter by an insulating cap 88. The ring 78, preferably of an electrical conducting material such as aluminum, is secured to cover plate 76 by means of small screws 80, which thread into cover plate 76. The lead wire 62, which is attached to the common wire 60 connecting the outer shells of the individual counters 32, is also secured to the ring 78 by means of one of the screws 80. Alternatively, the common wire 60 and the lead wire 62 can be omitted and the outer shells 34 of the counters will still be electrically coupled to housing 98 of the coaxial connector 94 through the respective bushings 68, the cup-shaped retainer 66, and the cover plate 76. A spacing ring 82 is placed between the cover plate 76 and a projecting shoulder 83 on the connector 94. The upper end of the counter case 6 is closed by means of a top plate 84 having a center opening for connector 94, and is secured to the outer case by means of cap screws 86, which pass radially through tube 6 and thread into top plate 84. The insulating cap 88, preferably of an insulating material, such as molded plastic, which retains the connector 94 in position, is attached to the top plate by means of cap screws 90. A small ring 92, of a resilient material, such as rubber, fits in an annular groove 93 formed on the outer surface of connector housing 98 and serves to seal the counter against the entry of dirt and dust.

As described above, the individual counters 32 are connected in parallel, the outer shells 34 being connected to the housing 98 of coaxial connector 94, which may in turn be connected to ground, while the central wires 44 are adapted to be connected to the hot side of the applied potential by means of the female contact of coaxial connector 94. The operation of BF₃ counters is well known and requires that a potential be established between the counter shell 34 or cathode of each counter, and the central wire 44 or anode thereof, so that the gas filling may be ionized when free electrons are released. In the present embodiment of our invention, we prefer to connect the hot side of the applied potential to the central wires 44 of the individual counters and thus have the outer shells 34 of the individual counters connected to ground. The pulses transmitted by the counter cells may be supplied to any well known amplifier and counter circuit through the coaxial connector 94.

The seven individual counters of Fig. 1 have a diameter of approximately one-half inch which is about one-half the diameter of a standard BF₃ counter; and a gas pressure on the order of two atmospheres, while standard BF₃ counters have a gas pressure on the order of one-half to two-thirds atmosphere. Thus, we have substantially reduced the volume of the individual counters 32 by a factor of four and increased the pressure of boron trifluoride gas in each individual counter 32 by a factor of three to four, and yet our counters are substantially equal to a standard BF₃ counter in performance and sensitivity. This means that each individual counter will have the same sensitivity as a standard BF₃ counter for detecting thermal neutrons. However, since we have connected seven of our individual counters in parallel, the pulses will be the same amplitude as those of a standard BF₃ counter, but there will be about seven times as many. It will be appreciated that our counter will be about seven times as sensitive as a standard counter, yet will require only a fraction of the space of seven standard BF₃ counters; thus allowing more neutron slowing material to be placed around the individual counters.

We have thus provided a sensitive neutron detector comprised of a plurality of individual BF₃ counter cells surrounded by a material capable of slowing down fast neutrons to thermal neutron velocities. The material which surrounds the counter cells being a material of low atomic number does not interact strongly with gamma radiation. Thus, our individual counter cells will not lose their sensitivity when operated in a source of neutron radiation which also includes a large amount of gamma radiation. The individual counter cells of our counter are connected in parallel, thereby increasing the sensitivity of our counter by a factor equal to the number of individual counter cells. We have enclosed our counter structure in an outer shell so that it can be used without danger of injuring the sensitive individual counter cells by jarring or striking the counter. By reducing the diameter of our counter cells while increasing the pressure of the gas, we have maintained the same amount of sensitive gas in a reduced volume, thus providing additional volume for a low atomic number material to slow down fast neutrons.

While we have illustrated our invention by referring to BF₃ counters, any proportional type of counter could be used and our invention would still operate.

We claim as our invention:

1. A radiation detector comprising a plurality of elongated counters capable of detecting thermal neutrons, said counters each including an outer electrode and an inner electrode spaced therefrom, a first block of neutron-moderating material having a plurality of recesses formed therein into which said counters are individually and supportedly inserted, a second block of moderating material having a plurality of holes extending therethrough and disposed in alignment with said recesses, said second block being positioned adjacent said first block and said counters extending through said holes, means for coupling said inner electrodes in electrical parallel and means associated with at least one of said blocks for coupling said outer electrodes in electrical parallel.

2. A radiation detector comprising a plurality of elongated counters capable of detecting thermal neutrons, said counters each including an outer electrode and an inner electrode spaced therefrom, a first block of neutron-moderating material disposed adjacent the bottom of said casing, said block having a plurality of recesses formed therein into which said counters are individually and supportedly inserted, a second block of moderating material having a plurality of holes extending therethrough and disposed in alignment with said recesses, said second block being positioned adjacent said first block and said counters extending through said holes, means for coupling said inner electrodes in electrical parallel and means associated with said second block for coupling said outer electrodes in electrical parallel, said last mentioned means including an electrically conductive cup-shaped member having apertures in the bottom wall thereof disposed in alignment with said recesses and said holes, electrically contacting means secured adjacent each of said apertures and engaging said outer electrodes individually, and means for clamping said cup-shaped member and said first and said second blocks together to secure electrical contact between said outer electrodes and said contacting means, respectively.

3. A radiation detector comprising a plurality of elongated counters capable of detecting thermal neutrons, said counters each including an outer electrode and an inner electrode spaced therefrom, a first block of neutron-moderating material, said block having a plurality of recesses formed therein into which said counters are individually and supportedly inserted, a second block of moderating material having a plurality of holes extending therethrough and disposed in alignment with said recesses, said second block being positioned adjacent said first block and said counters extending through said holes, means for coupling said inner electrodes in electrical parallel, and means associated with one of said first and said second blocks for coupling said outer electrodes in electrical parallel, said last mentioned means including an electrical conductor surrounding said counters and secured in electrically conductive relationship to each of said outer electrodes, said conductor being disposed in a recess formed in one of said moderating blocks and connecting said outer electrodes in electrical parallel.

4. A radiation detector comprising a block of neutron-moderating material having a plurality of recesses formed therein, a counter capable of detecting thermal neutrons inserted into each of said recesses and protruding therefrom, said counters each including an outer electrode and an inner electrode spaced therefrom, an electrically conductive cup-shaped member positioned adjacent said moderating block and having apertures in the bottom wall thereof disposed in alignment with said recesses, respectively and having electrically contacting means secured thereto at positions individually adjacent said apertures, said contacting means engaging said outer electrodes, and means for clamping said cup-shaped member and said moderating block together to secure electrical contact between said contacting means and said outer electrodes, respectively, and circuit means for coupling said inner electrodes in electrical parallel.

5. A radiation detector comprising a block of neutron-moderating material having a plurality of recesses formed therein, a counter capable of detecting thermal neutrons inserted into each of said recesses, said counters each including an outer electrode and an inner electrode spaced therefrom, an electrically conductive cup-shaped member positioned adjacent said moderating block and having apertures in the bottom wall thereof disposed in alignment with said recesses, respectively, and having electrically conductive tapered members secured thereto at positions individually adjacent said apertures, said tapered members extending into said recesses and engaging said outer electrodes, respectively, means for clamping said cup-shaped member and said moderating block together to secure electrical contact between said tapered members and said outer electrodes, respectively, a pair of coaxial conductors secured to said casing, means for electrically connecting said cup-shaped member to one of said conductors, and circuit means for coupling said inner electrodes in electrical parallel to the other of said conductors.

6. A radiation detector comprising a casing, a block of neutron-moderating material supported in said casing and having a plurality of elongated recesses formed therein, an elongated proportional counter capable of detecting thermal neutrons inserted into each of said recesses, said counters each including an outer electrode and an inner electrode spaced therefrom, an electrically conductive cup-shaped member positioned adjacent said moderating block and having apertures in the bottom wall thereof disposed in alignment with said recesses, respectively, and having electrically conductive tapered members secured thereto at positions individually adjacent said apertures, said tapered members extending into said recesses and engaging said outer electrodes, respectively, and means for clamping said cupshaped member and said moderating block together to secure electrical contact between said tapered members and said outer electrodes, respectively.

7. A radiation detector comprising a block of neutron-moderating material having a plurality of recesses formed therein, a counter capable of detecting thermal neutrons inserted into each of said recesses, said counters each including an outer electrodal casing and an inner electrode spaced therefrom, an electrically conductive cup-shaped member positioned adjacent said moderating block and having a plurality of apertures formed in the bottom wall thereof, said apertures being disposed in alignment with said recesses, an electrically conductive sleeve inserted into each of said apertures and secured in electrically conductive relationship to said member, said counter casings being individually inserted into said sleeves and frictionally engaging the inner surface thereof to secure electrical contact between said sleeves and said casings, and circuit means for connecting said inner electrodes in electrical parallel.

8. A radiation detector comprising a block of moderating material having a plurality of recesses formed therein, a counter capable of detecting thermol neutrons inserted into each of said recesses, said counters each including an outer electrode and an inner electrode spaced therefrom, an electrically conductive cup-shaped member disposed adjacent said moderating block and having a plurality of apertures in the bottom wall thereof disposed in alignment with said recesses, an electrically conductive sleeve member inserted through each one of said apertures and secured to said cup-shaped member, the inward surfaces of said sleeve members being tapered outwardly, said counter casings being inserted individually into said sleeve members in engagement with their tapered surfaces and means for clamping said cup-shaped member and said moderating block together to secure electrical contact between said tapered surfaces and said outer electrodes respectively, and means for connecting said inner electrodes in electrical parallel.

9. A radiation detector comprising a block of neutron-moderating material having at least one longitudinal recess therein, an elongated counter capable of detecting thermal neutrons inserted into said recess, said counter having an outer electrode and an inner electrode spaced therefrom, an end of said counter protruding from said recess and being inserted into a closely fitting electrically conductive sleeve, means for clamping said sleeve to said block to secure electrical contact between said sleeve and said outer electrode, and means for connecting said sleeve and said inner electrode to external metering circuitry.

10. A radiation detector comprising a sealed casing, a block of neutron-moderating material disposed within said casing and having a plurality of elongated recesses formed therein, a plurality of thermal neutron counters individually inserted into said recesses, said counters each having an outer electrode and an inner electrode spaced therefrom, a gaseous filling in each of said counters, said gaseous filling having a pressure between two and three atmospheres and including an element capable of emitting a charged particle upon reaction with a thermal neutron, and means for connecting said outer electrodes in electrical parallel and for connecting said inner electrodes in electrical parallel, said counters each being supported between said means and a wall of its associated recess.

11. A radiation detector comprising a plurality of counters capable of detecting thermal neutrons, said counters each including an outer electrode and an inner electrode spaced therefrom, at least one block of neutron-moderating material having a plurality of recesses formed therein into which said counters are individually and supportedly inserted, electrical contacting means extending into each of said recesses and contacting electrically each of said outer electrodes, said contacting means coupling said outer electrodes in electrical parallel, and means coupling said inner electrodes in electrical parallel.

References Cited in the file of this patent

UNITED STATES PATENTS

| | | |
|---|---|---|
| 2,316,361 | Piety | Apr. 13, 1943 |
| 2,397,071 | Hare | Mar. 19, 1946 |
| 2,462,471 | Crumrine | Feb. 22, 1949 |
| 2,491,220 | Segre et al. | Dec. 13, 1949 |
| 2,521,656 | Segre et al. | Sept. 5, 1950 |
| 2,556,768 | McKibben | June 12, 1951 |
| 2,680,201 | Scherbatskoy | June 1, 1954 |

OTHER REFERENCES

"Ionization Chambers and Counters," by Rossi and Staub, published by McGraw-Hill Book Co., 1949, pages 190–192.